US007774079B2

(12) United States Patent
Alderson

(10) Patent No.: US 7,774,079 B2
(45) Date of Patent: Aug. 10, 2010

(54) METHOD AND SYSTEM FOR RECEIVING AND DECODING AUDIO SIGNALS

(75) Inventor: Jeffrey Donald Alderson, Austin, TX (US)

(73) Assignee: Sigmatel, Inc., Austin, TX (US)

( * ) Notice: Subject to any disclaimer, the term of this patent is extended or adjusted under 35 U.S.C. 154(b) by 1346 days.

(21) Appl. No.: 11/242,404

(22) Filed: Oct. 3, 2005

(65) Prior Publication Data

US 2007/0078542 A1 Apr. 5, 2007

(51) Int. Cl.
*G06F 17/00* (2006.01)

(52) U.S. Cl. .......... 700/94

(58) Field of Classification Search .......... 700/94
See application file for complete search history.

(56) References Cited

U.S. PATENT DOCUMENTS 4,691,234 A 9/1987 Albean
5,357,284 A 10/1994 Todd
5,373,562 A 12/1994 Albean
5,929,811 A 7/1999 Rilling
6,118,879 A 9/2000 Hanna
6,259,482 B1 7/2001 Easley et al.
6,281,813 B1 8/2001 Vierthaler et al.

*Primary Examiner*—Andrew C Flanders
(74) *Attorney, Agent, or Firm*—Toler Law Group

(57) ABSTRACT

A system and method for decoding a received television signal is disclosed. The system includes an input to receive a digital audio signal and a digital variable deemphasis module to modify the amplitude of the digital audio signal based on a plurality of variable coefficients. The system also includes an exponential digital root mean square (ERMS) detector to provide level detection of the digital audio signal. The plurality of variable coefficients of the digital variable deemphasis module are digitally computed based on an output of the digital ERMS detector.

33 Claims, 5 Drawing Sheets

METHOD AND SYSTEM FOR RECEIVING AND DECODING AUDIO SIGNALS

FIELD OF THE DISCLOSURE

The present disclosure is generally related to audio receivers for use in television systems.

BACKGROUND

Television signals may be broadcast in a variety of different formats. For example, the audio portion of a television signal may be broadcast in the Broadcast Television Systems Committee (BTSC) format. A received BTSC-encoded television signal is filtered and decoded according to the BTSC protocol. Decoding of received television audio signals has often been done using analog filters and decoders. However, use of analog circuits may be undesirable, because of power consumption, circuit component size, circuit flexibility, and other factors. Accordingly, there is a need for an improved method and system of decoding a received television audio signal using digital circuits.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DESCRIPTION OF THE DRAWINGS

A system and method for decoding a received television signal is disclosed. The system includes an input to receive a digital audio signal and a digital variable deemphasis module to filter the digital audio signal based on a plurality of variable coefficients. The system also includes an exponential digital root mean square (ERMS) detector to provide level detection of the digital audio signal. The plurality of variable coefficients of the digital variable deemphasis module are digitally computed based on an output of the digital ERMS detector.

The method includes receiving a digital audio input signal, dynamically calculating a first set of coefficients at a first time based on a sigmoid function of a measured level of the digital audio input signal, and deemphasizing the digital audio input signal using a filter having filtering characteristics based on the first set of coefficients.

Figure 1:
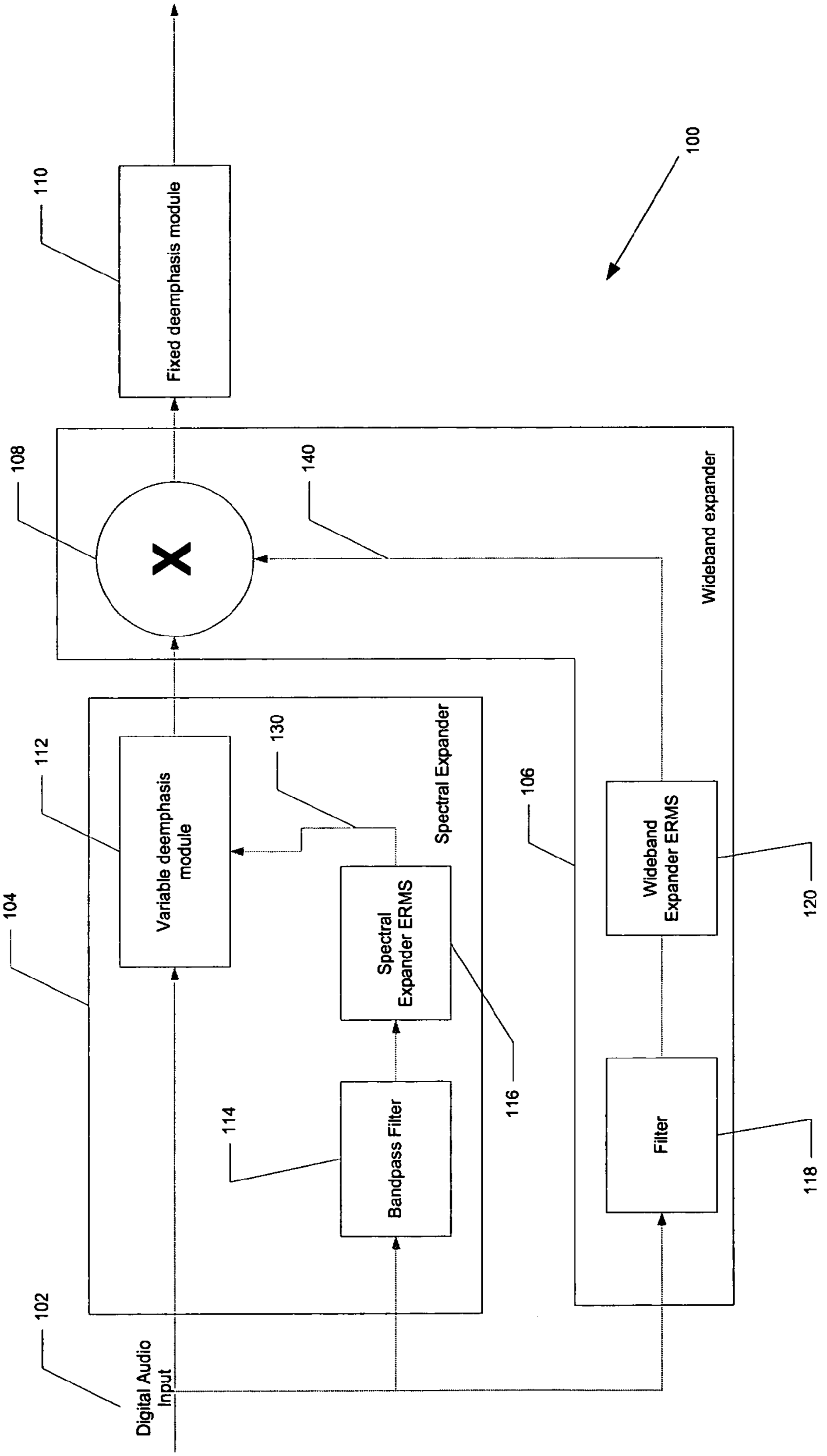
FIG. 1 is a block diagram of a exemplary embodiment of a BTSC expander.

Referring to FIG. 1, a BTSC expander system 100 is illustrated. The BTSC expander 100 includes a spectral expander 104, a wide band expander 106, and a fixed deemphasis module 110. The spectral expander 104 includes a variable deemphasis module 112, a band pass filter 114, and an spectral expander exponential root mean square (ERMS) module

1116. The wide band expander 106 includes a band pass filter 118, a wide band expander exponential root mean square (ERMS) module 120, and a multiplier 108.

The variable deemphasis module receives a digital audio input signal 102. The filter 114 also receives the digital audio input signal 102. An output of the filter 114 is coupled to the spectral expander ERMS 116. An output 130 of the spectral expander ERMS 116 is coupled to the variable deemphasis module 112. An output of the variable deemphasis module 112 is coupled to an input of the multiplier 108. The filter 118 has an input to receive the digital audio input signal 102. An output of the filter 118 is coupled to the ERMS wide band expander 120. An output of the ERMS wide band expander 120 is coupled to the multiplier 108. An output of the multiplier 108 is coupled to the fixed deemphasis module 110.

During operation, the television audio receiver system 100 decodes the digital audio input signal 102. The digital audio input signal 102 may be a signal that is compliant with the Broadcast Television Systems Committee (BTSC) television standard. In a particular embodiment, the digital audio input signal 102 is based on a received analog television signal that has been converted into a digital format. The digital audio input signal may be based on a signal that was encoded to "emphasize", or amplify, the signal at certain frequencies in order to improve transmission of the signal. In order to decode the signal, the television audio receiver system 100 performs several "deemphasis" operations.

The digital audio input signal 102 is decoded in several stages. The variable deemphasis module 112 performs a filtering, or "deemphasis", operation on the digital audio input signal 102. The filter response for the variable deemphasis module varies according to a measured level of the digital audio input signal 102.

After the digital audio input signal 102 has been deemphasized by the variable deemphasis module 1112, the wideband expander 106 compounds the output of the spectral expander 104 by multiplying that output by the output of the wideband expander ERMS 120 using the multiplier 108. The fixed deemphasis module 110 performs a deemphasis operation on the output of the wideband expander 106 by filtering that output. In a particular embodiment, the filter response of the fixed deemphasis module 110 is fixed in that it does not vary according to a measured level of the digital audio input signal 102.

The output of the fixed deemphasis module 110 is a decoded digital audio signal. The decoded digital audio signal may be provided to additional logic for further processing, and then broadcast to a television user.

As explained above, a function of the variable deemphasis module 102 is to deemphasize the digital audio input signal 102 by performing a filtering operation on the signal. In a particular embodiment the digital variable deemphasis module 112 includes an infinite impulse response (IIR) filter. The IIR filter provides a filter response based on a plurality of variable coefficients. The variable coefficients are digitally computed based on an output of the spectral expander ERMS 116, which provides a measured level of the digital audio input signal 102. Accordingly, the filter response of the variable deemphasis module depends on a level of the digital audio input signal 102 measured by the spectral expander ERMS 116.

The spectral expander ERMS 116 performs as a digital root mean square (RMS) detector to provide level detection of the digital audio input signal 102. In a particular embodiment the spectral expander ERMS 116 operates at a release rate of about 125 decibels per second.

The wide band expander 106 performs a wide band expanding operation on the digital audio input signal 102 using the filter 118 and the ERMS wide band expander 120. In a particular embodiment, a filter response of the filter 114 is different from a filter response of the filter 118. In a particular embodiment, the filter 114 is a high pass filter and the filter 118 is a low pass filter with a slower roll off rate than the filter 114. In a particular embodiment the wideband expander ERMS 106 operates at a release rate of about 381 dB per second.

The multiplier 108 receives the output of the variable deemphasis module 112 and the ERMS wide band expander 120 to perform a multiplication operation. The output of the multiplier 108 is provided to the fixed deemphasis module 110 for further processing. The fixed deemphasis module 110 performs a deemphasis operation on the output of the multiplier 108 by filtering the output. In a particular embodiment the fixed deemphasis module 110 includes a low pass filter.

Figure 2:
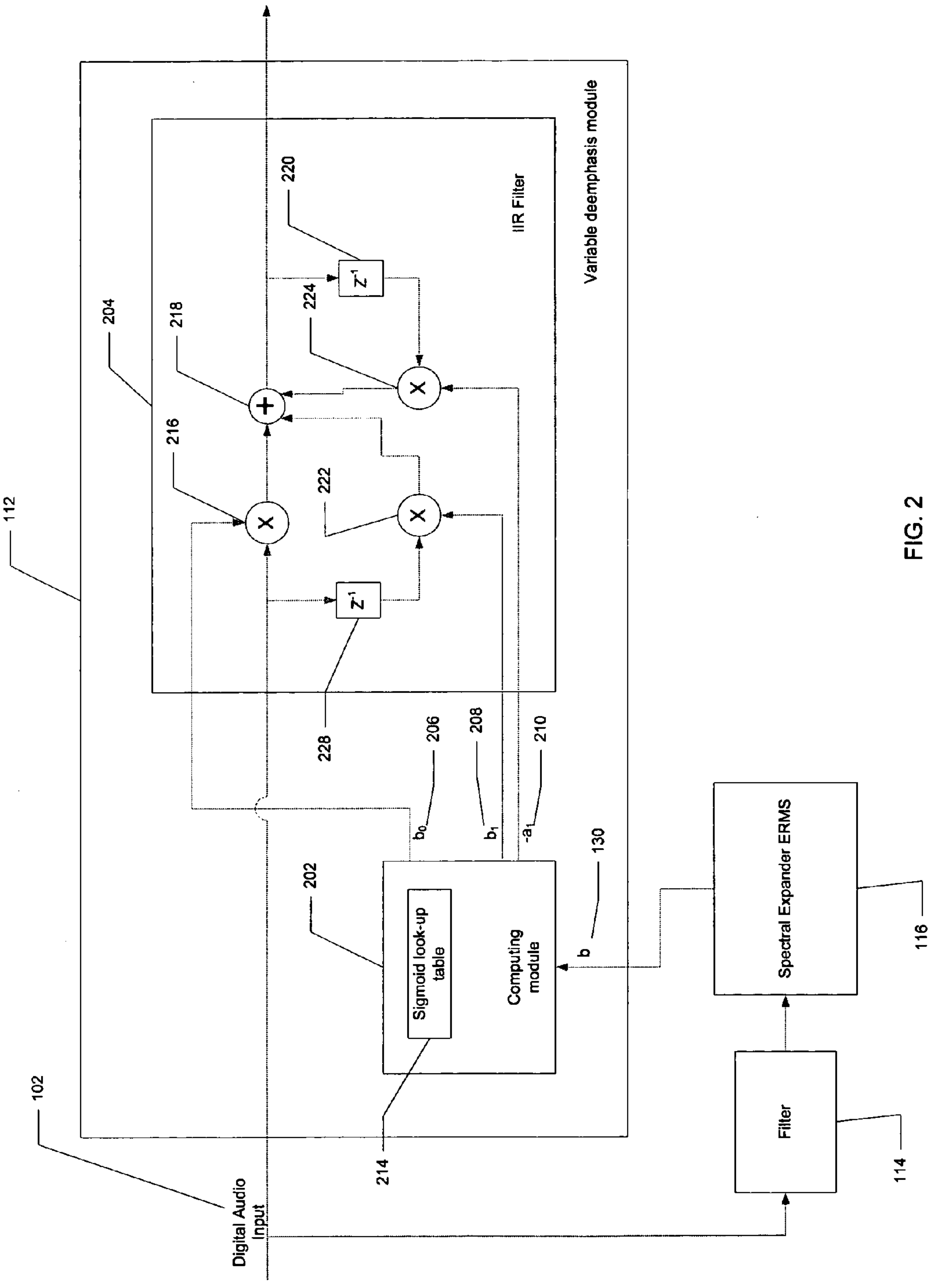
FIG. 2 is a block diagram of an illustrative embodiment of a spectral expander of the television audio receiver system of FIG. 1.

Referring to FIG. 2, an exemplary embodiment of a spectral expander variable deemphasis module, such as the spectral expander 104 illustrated in FIG. 1, is shown. The spectral expander 104 includes the variable deemphasis module 112. The variable deemphasis module 112 includes a computing module 202 and an IIR filter 204. The computer module 202 includes a sigmoid look-up table 214. The computer module 202 is coupled to the spectral expander ERMS, at 116. The sigmoid function module 214 receives an input 130, labeled “b” from the spectral expander ERMS 116. The computer module 202 provides a number of coefficients to the IIR filter including a first coefficient 206, labeled “$b_0$”, a second coefficient 208, labeled “$b_1$”, and a third coefficient 210, labeled “$-a_1$”.

The IIR filter 204 includes a multiplier 216 and an adder 218. The IIR filter 204 further includes a first delay element 228 and a second delay element 220. The IIR filter 204 also includes a second multiplier 222 and a third multiplier 224. The first multiplier 216, the second multiplier 222, and the third multiplier 224 receive the coefficients from the computing module 202.

During operation, the variable deemphasis module 112 performs a deemphasis operation on the digital audio input signal 102 by filtering the signal. The filter response of the variable deemphasis module 112 is determined based on a measured level of the digital audio input signal 102.

In particular, the variable deemphasis module receives the digital audio input signal 102. The IIR filter 204 has a filter response determined based on the coefficients 206, 208 and 210.

During operation, the spectral expander ERMS 116 performs a level detection on the digital audio input signal 102. The spectral expander ERMS 116 provides the output 130, to the variable deemphasis module 112. The filter coefficients 206, 208 and 210 are determined based on this output. The computing module 202 calculates the coefficients 206, 208 and 210 dynamically based on a sigmoid function. The computer module 202 receives the output 130 and consults the look-up table 214 based on the received output. In a particular embodiment the computing module 202 performs a linear interpolation with respect to one or more data points in the sigmoid look-up table 214 that correspond to the received output 130. The coefficients 206, 208, and 210 are based on this interpolation.

In a particular embodiment the sigmoid look-up table 214 includes a number of data points corresponding to a number of points on a sigmoid curve. In another particular embodiment the number of points represented by the number of data points is less than forty. In an illustrative embodiment the sigmoid look-up table 214 includes more data points associated with an area of high curvature of a sigmoid curve than the number of data points associated with an area of low curvature of the sigmoid curve.

The coefficients 206, 208, and 210 are provided to the IIR filter 204. The IR filter 204 uses these coefficients to filter the digital audio input signal 102.

Figure 3:
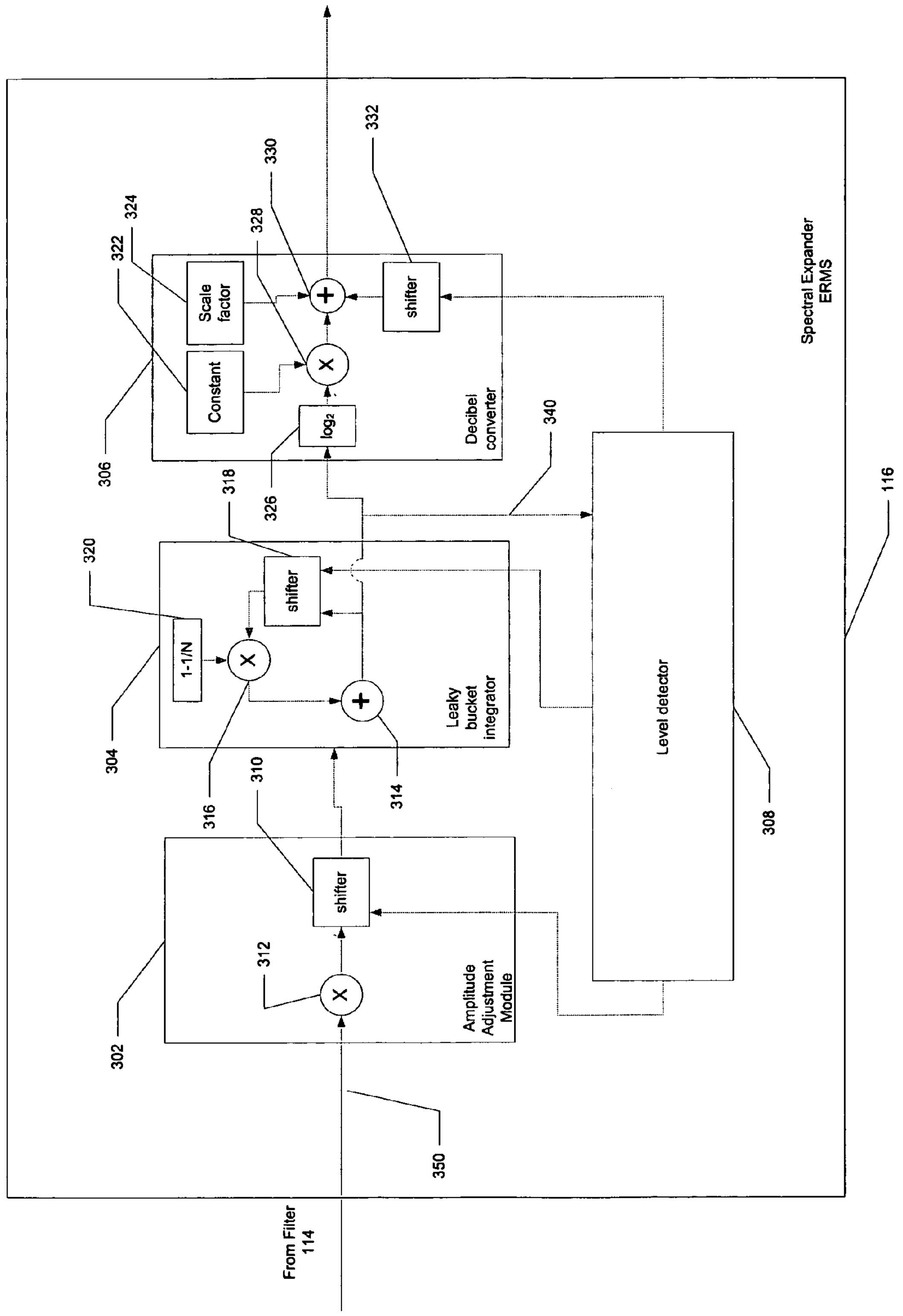
FIG. 3 is a block diagram of a particular embodiment of the spectral expander exponential root mean square (ERMS) of FIG. 2.

Referring to FIG. 3, an illustrative embodiment of an spectral expander ERMS, such as the spectral expander ERMS 116 depicted in FIG. 1, is shown. The spectral expander ERMS 116 includes an amplitude adjustment module 302, a leaky bucket integrator 304, a decibel converter 306 and a level detector 308. The amplitude adjustment module 302 receives an input signal 350. In a particular embodiment, the digital audio signal 350 is based on a BTSC encoded television audio signal. An output of the amplitude adjustment module 302 is coupled to an input of the leaky bucket integrator 304. An output of the leaky bucket integrator 304 is coupled to an input of the decibel converter 306 and an input of the level detector 308. The level detector 308 includes three outputs, with one coupled to the amplitude adjustment module, one coupled to the leaky bucket integrator, and one coupled to the decibel converter. The decibel converter 306 provides an output 130 related to a detected level of the digital input signal 102.

The amplitude adjustment module 302 includes a shifter 310 and a multiplier 312. The multiplier 312 includes two inputs responsive to the digital input 350. The shifter 310 is responsive to an output of the multiplier 310. In a particular embodiment the amplitude adjustment module 302 is a squaring module and provides a squared value of its input.

The leaky bucket integrator 304 includes an adder 314, a shifter 318, a multiplier 316, and a constant module 320. The adder 314 is responsive to an output of the amplitude adjustment module 302. The shifter 318 is coupled to an output of the adder 314. An output of the shifter 318 is coupled to an input of the multiplier 316. The constant module 320 is coupled to a second input of the multiplier 316. An output of the multiplier 316 is coupled to an input of the adder 314.

The decibel converter 306 includes a logarithm module 326, a multiplier 328, an adder 330, and a shifter 332. The decibel converter 306 further includes a constant module 322 and a scale factor 324.

During operation, the amplitude adjustment module 302 performs a squaring operation on the input signal 350 and adjusts the amplitude of the result using the shifter 310. The leaky bucket integrator 304 integrates the output of the amplitude adjustment module. Over time, the leaky bucket integrator provides an output that represents an average of the integrator input. The decibel converter 306 performs as an output adjustment module responsive to an output of the integrator 304 to provide an output representing a detected level of a digital audio signal received at the input.

The dynamic range of the spectral expander ERMS 116 may be adjusted based on a measured level of the input signal 350, measured at an output of the leaky bucket integrator 340, allowing the spectral expander ERMS 116 to process a wider range of input signals.

To control the dynamic range of the spectral expander ERMS 116, the level detector 308 controls the amplitude adjustment module 302, the leaky bucket integrator 304, and the decibel converter 306. The level detector 308 receives an input 340 from the leaky bucket integrator 304. Based on the input 340, the level detector controls an amplitude of a digital audio signal received at the input of the amplitude adjustment module 302 to change the dynamic range of the spectral expander ERMS 116. The level detector 308 controls the amplitude of the digital audio signal by controlling the shifter 310. The shifter 310 receives the digital audio signal and shifts the signal to amplify or attenuate the signal. The amount of shifting performed by the shifter 310, and therefore the amount of amplification or attenuation of the digital audio signal, is controlled by the level detector 308, based on the input 340. In this way, by controlling the shifter 310, the level detector 308 controls a gain characteristic of the amplitude adjustment module 302.

The level detector 308 also controls a gain characteristic of the output adjustment module 306 by controlling the shifter 332. The level detector 308 may increases a gain characteristic of the amplitude adjustment module 302 via a first amount and attenuate a gain characteristic of the output adjustment module 306 by a second amount. By controlling the gain characteristics of the output adjustment module 306 and the amplitude adjustment module 302, the level detector 308 can control the dynamic range of the spectral expander ERMS 116. The decibel converter 306 performs as a base-two logarithmic converter.

Figure 4:
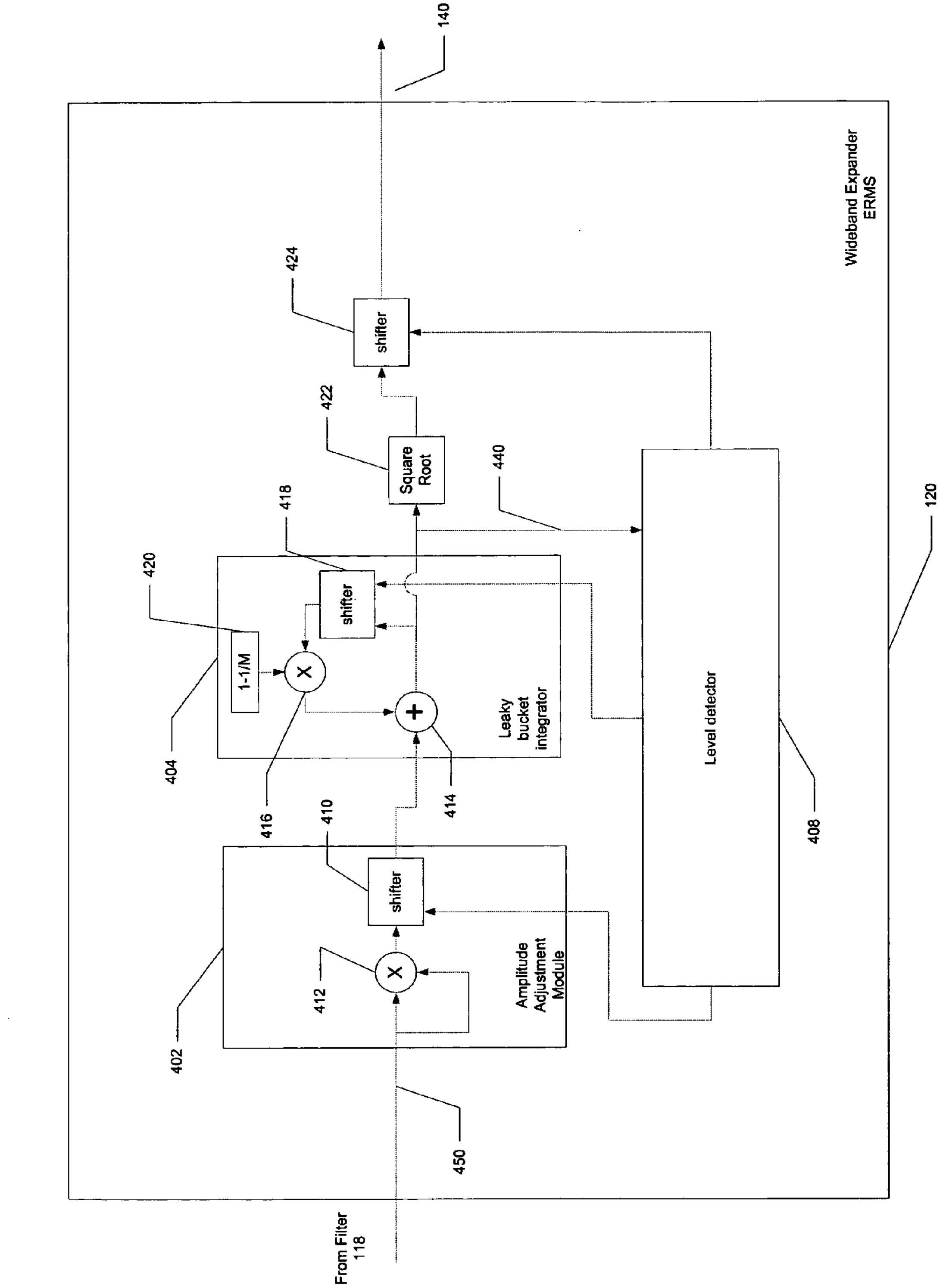
FIG. 4 is a block diagram of an exemplary embodiment of an wideband expander ERMS of the television audio receiver system of FIG. 1.

Referring to FIG. 4, an exemplary embodiment of an ERMS wide band expander, such as the ERMS wide band expander 120 as illustrated in FIG. 1, is shown. The ERMS wide band expander 120 includes an amplitude adjustment module 402, a leaky bucket integrator 404, a square root module 422 and a shifter 424. The ERMS wide band expander also includes a level detector 408. The level detector includes outputs coupled to the amplitude adjustment module 402, the leaky bucket integrator 404 and the shifter 424.

The amplitude adjustment module receives an input signal 450. An output of the amplitude adjustment module 402 is coupled to the leaky bucket integrator 404. An output of the leaky bucket integrator 404 is coupled to an input of the square root module 422. The output of the leaky bucket integrator 404 is also coupled to an input of the level detector 408. An output of the square root module 422 is coupled to an input of the shifter 424. The shifter 424 provides the output of the ERMS wide band expander 120.

The amplitude adjustment module 402 includes a shifter 410 and a multiplier 412. The multiplier 412 receives a first and a second input from the input signal 450. The shifter 410 is responsive to an output of the multiplier 412. An output of the shifter 410 is coupled to the leaky bucket integrator 404. The leaky bucket integrator 404 includes an adder 414, a multiplier 416 and a shifter 418. The leaky bucket integrator also includes a constant module 420. An output of the adder 414 is coupled to the shifter 418. An output of the shifter 418 is coupled to an input of the multiplier 416. An output of the constant module 420 is coupled to a second input of the multiplier 416. An output of the multiplier 416 is coupled to an input of the adder 414.

During operation the level detector 408 determines a level of the output 440 of the leaky bucket integrator 404. Based on this measured level, the level detector 408 may provide control signals to adjust a transfer characteristic at the amplitude adjustment module 402, the leaky bucket integrator 404, and the shifter 424. The level detector 408 may adjust these transfer characteristics by controlling the shifter 410, the shifter 418, and the shifter 424. The level detector 408 may thereby adjust the dynamic range of the EERMS wide band expander 120 based on the detected level of the output of the leaky bucket integrator 404.

Figure 5:
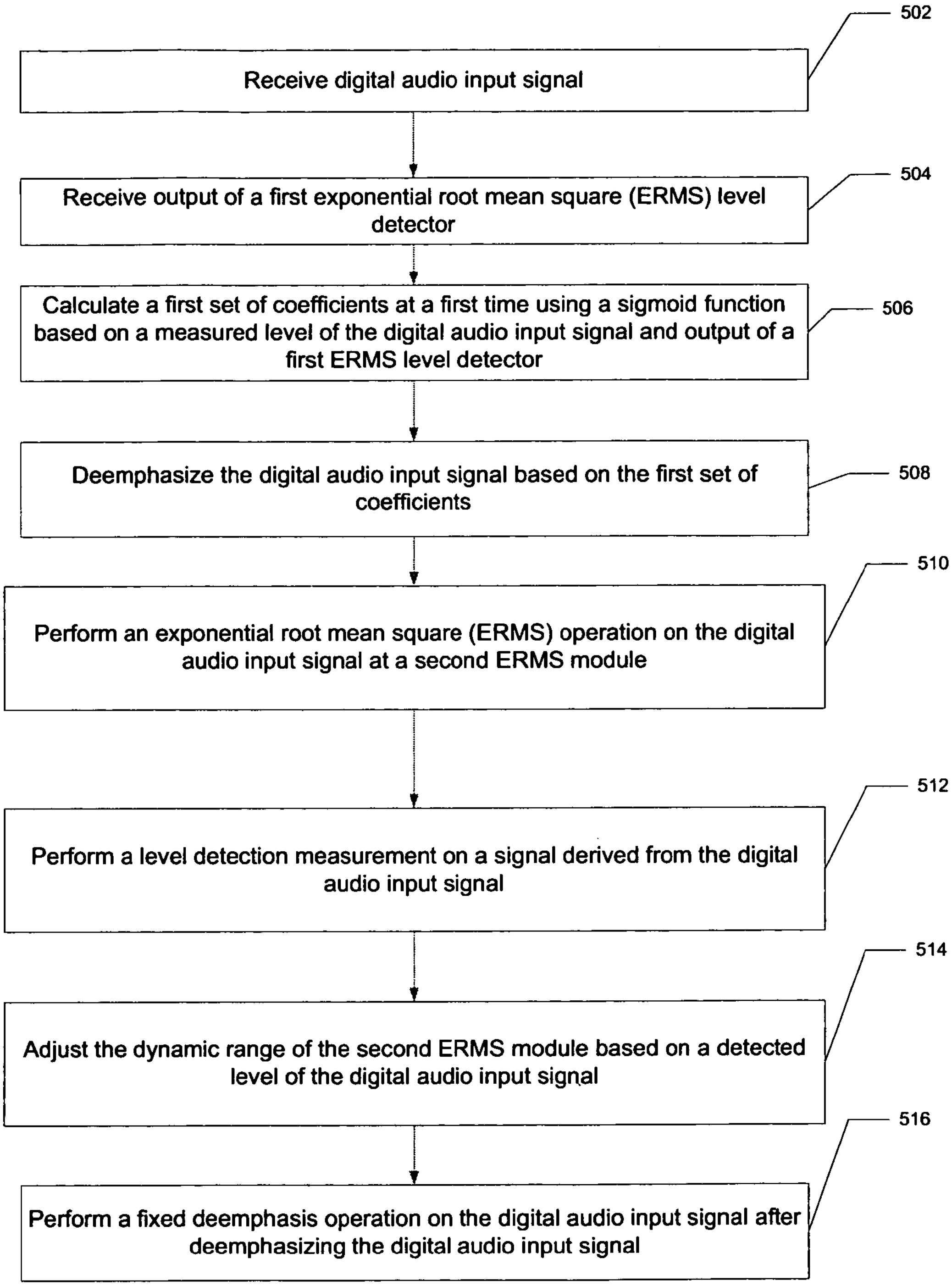
FIG. 5 is a flow chart of a method of decoding a received television signal.

Referring to FIG. 5, a method of processing an audio input signal is illustrated. At step 502, a digital audio input signal is received. In a particular embodiment, the digital audio input signal is based on a received television audio signal. In a particular embodiment the digital audio input signal is associated with an analog signal compliant with the Broadcast Television System Committee (BTSC) television audio standard. In another particular embodiment the digital audio input signal is associated with an analog signal compliant with the EIA/J television audio standard.

Moving to step 504, an output of a first exponential root mean square (ERMS) level detector, representing a detected level of the digital audio input signal, is received. At step 506, a first set of coefficients is calculated at a first time using a sigmoid function based on the output of the first ERMS level detector. Proceeding to step 508, the digital audio input signal is deemphasized based on the first set of coefficients. In a particular embodiment, the digital audio input signal is deemphasized by filtering the signal using a filter response based on the first set of coefficients.

Moving to step 510, an exponential root mean square (ERMS) operation is performed on the digital audio input signal at a second ERMS module. The ERMS operation at the second ERMS module represents a wideband expansion operation on the digital audio input signal. At step 512, a level detection measurement is performed on a signal derived by filtering the digital audio input signal. Proceeding to step 514, a dynamic range of the second ERMS module is adjusted based on the detected level of the digital audio input signal. By adjusting the dynamic range of the second ERMS module, a wide range of digital audio input signals may be processed. Proceeding to step 516, a fixed deemphasis operation is performed after deemphasizing the digital audio input signal. After the fixed deemphasis operation has been performed, the digital audio input signal is decoded and is ready for further processing before being provided to a user via a television speaker.

The above disclosed subject matter is to be considered illustrative, and not restrictive, and the appended claims are intended to cover all such modifications, enhancements, and other embodiments which fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A system comprising:

an input to receive a digital audio signal;

a digital variable deemphasis module to modify an amplitude of the digital audio signal based on a plurality of variable coefficients;

a first digital exponential root mean square (ERMS) detector to provide level detection of the digital audio signal; and wherein the plurality of variable coefficients are obtained from an interpolation of points in a sigmoid look-up table addressed by an output of the first digital ERMS detector.

2. The system of claim 1, wherein the digital variable deemphasis module modifies the amplitude of the digital audio signal by filtering the digital audio signal using a filter having characteristics based on the plurality of variable coefficients.

3. The system of claim 1, wherein the first digital ERMS detector is responsive to a first filter that is responsive to the input.

4. The system of claim 3, wherein a filter response of the first filter is different from a filter response of a second filter coupled to a second digital ERMS detector.

5. The system of claim 1, wherein the first digital ERMS detector includes an amplitude adjustment module to adjust an input of the first digital ERMS detector, an integrator responsive to the amplitude adjustment module, an output adjustment module responsive to an output of the integrator, and a level detector to control the amplitude adjustment module, the integrator, and the output adjustment module.

6. The system of claim 5, wherein the level detector detects a level of the output of the integrator.

7. The system of claim 1, wherein the first digital ERMS detector operates at a release rate of about 125 deci-Bels (dB) per second.

8. The system of claim 1, further comprising:

a multiplier having a first multiplier input responsive to the digital variable deemphasis module.

9. The system of claim 8, further comprising:

a wideband expander, wherein the multiplier includes a second multiplier input that is responsive to the wideband expander.

10. The system of claim 9, wherein the wideband expander includes a second digital exponential root mean square (ERMS) detector.

11. The system of claim 10, wherein the first ERMS detector includes a decibel conversion module and the second ERMS detector does not include a decibel conversion module.

12. The system of claim 10, wherein the second digital ERMS detector operates at a release rate of about 381 deci-Bels (dB) per second.

13. The system of claim 10, wherein the second digital ERMS detector is responsive to a filter.

14. The system of claim 9, further comprising:

a digital fixed deemphasis module responsive to an output of the multiplier.

15. The system of claim 14, wherein the digital fixed deemphasis module includes a low pass filter.

16. The system of claim 1, wherein the digital variable deemphasis module includes an infinite impulse response (IIR) filter, and wherein the IIR filter provides a filter response based on the plurality of variable coefficients.

17. A variable deemphasis module comprising:

an input to receive a digital audio signal;

a digital filter having a filter response determined based on a plurality of variable coefficients, wherein the digital filter includes a first multiplier responsive to a first of the plurality of variable coefficients, a second multiplier responsive to a second of the plurality of variable coefficients, and a third multiplier responsive to a third of the plurality of variable coefficients; and a computing module to obtain the plurality of variable coefficients from an interpolation of points in a sigmoid look-up table addressed by a measured level of the digital audio signal.

18. The variable deemphasis module of claim 17, wherein the computing module includes a memory to store the sigmoid look-up table.

19. The variable deemphasis module of claim 18, wherein the sigmoid look-up table includes a plurality of fields corresponding to a plurality of points on a sigmoid curve, and wherein a number of points represented by the plurality of fields is less than 40.

20. The variable deemphasis module of claim 17, wherein the plurality of variable coefficients are based on an output of a root mean square (RMS) level detector.

21. The variable deemphasis module of claim 20, wherein the RMS level detector is an exponential root mean square (ERMS) level detector.

22. An expander system, comprising:

an input;

an amplitude adjustment module responsive to the input;

an integrator responsive to the amplitude adjustment module;

an output adjustment module responsive to the integrator to provide an output representing a detected level of a digital audio signal received at the input, wherein the output adjustment module comprises a decibel converter; and a level detector to control the amplitude adjustment module, the integrator, and the output adjustment module, wherein the level detector controls a transfer characteristic of the amplitude adjustment module by controlling a shifter; wherein the decibel converter comprises a base-2 logarithmic converter, a logarithm module responsive to the integrator, a multiplier responsive to the logarithm module, an adder responsive to the multiplier, and the shifter responsive to the level detector.

23. The expander system of claim 22, wherein the level detector controls an amplitude of a signal that is responsive to the digital audio signal received at the input to increase a dynamic range of the expander system.

24. The expander system of claim 22, wherein the level detector increases a gain characteristic of the amplitude adjustment module by a first amount and attenuates a gain characteristic of the output adjustment module by a second amount.

25. The expander system of claim 22, wherein the level detector detects a level of the output of the integrator.

26. The expander system of claim 22, wherein the level detector increases a gain characteristic of the amplitude adjustment module by a first amount and increases the output of the integrator by a corresponding amount.

27. The expander system of claim 22, wherein the integrator is a leaky bucket integrator.

28. The expander system of claim 22, wherein the amplitude adjustment module is a squaring module.

29. The expander system of claim 22, wherein the digital audio signal is a Broadcast Television Systems Committee (BTSC)-encoded television audio signal.

30. A method comprising:

receiving a digital audio input signal;

dynamically determining, at a variable deemphasis module, a first set of coefficients at a first time based on sigmoid function values in a look-up table addressed by a first measured level of the digital audio input signal taken at the first time;

deemphasizing, at the variable deemphasis module, the digital audio input signal using a filter having filtering characteristics based on the first set of coefficients; and dynamically determining, at the variable deemphasis module, a second set of coefficients at a second time based on the sigmoid function values in the look-up table addressed by a second measured level of the digital audio input signal taken at the second time.

31. The method of claim 30, wherein the filter is an infinite impulse response (IIR) filter.

32. The method of claim 30, wherein the first and second measured levels are determined by an exponential root mean square (ERMS) level detector.

33. The method of claim 30, further comprising:

performing a fixed deemphasis operation after deemphasizing the digital audio input signal.

* * * * *